US011223578B2

(12) United States Patent
Ota

(10) Patent No.: US 11,223,578 B2
(45) Date of Patent: Jan. 11, 2022

(54) SYSTEM AND CONTROL METHOD TO DIRECT TRANSMISSION OF EVENT DATA TO ONE OF A PLURALITY OF RECEPTION QUEUES

(71) Applicant: CANON KABUSHIKI KAISHA, Tokyo (JP)

(72) Inventor: Shunsuke Ota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 16/810,718

(22) Filed: Mar. 5, 2020

(65) Prior Publication Data
US 2020/0287847 A1 Sep. 10, 2020

(30) Foreign Application Priority Data
Mar. 8, 2019 (JP) .............................. JP2019-042588

(51) Int. Cl.
*H04L 12/861* (2013.01)
*H04L 12/875* (2013.01)

(52) U.S. Cl.
CPC .............. *H04L 49/90* (2013.01); *H04L 47/56* (2013.01)

(58) Field of Classification Search
CPC ...... G06F 3/1267; G06F 3/122; G06F 3/1274; G06F 3/12; H04L 41/0896; H04L 48/028; H04L 47/30; H04L 49/90; H04L 47/56; H04L 12/861; H04L 12/875; G16Y 20/30

USPC ......................................................... 370/429
See application file for complete search history.

(56) References Cited

U.S. PATENT DOCUMENTS

| 6,199,100 | B1 * | 3/2001 | Filepp .................... C08L 67/025 |
| | | | 707/E17.032 |
| 9,442,681 | B2 * | 9/2016 | Sasaki ...................... G06F 3/122 |
| 10,452,328 | B2 * | 10/2019 | Olds ....................... G06F 3/1238 |
| 11,003,400 | B2 * | 5/2021 | Uchida ................... H04L 43/028 |
| 2016/0261481 | A1 * | 9/2016 | Ogata ...................... H04L 43/10 |
| 2020/0287848 | A1 * | 9/2020 | Yuki ....................... H04L 47/26 |

FOREIGN PATENT DOCUMENTS

JP 2016-163242 A 9/2016

* cited by examiner

*Primary Examiner* — Man U Phan
(74) *Attorney, Agent, or Firm* — Canon U.S.A., Inc. I.P. Division

(57) ABSTRACT

A system includes a plurality of client terminals, and a reception service system receiving data from the plurality of client terminals. The reception service system includes a first queue configured to receive data to be a target of predetermined processing, and a second queue configured to receive data not to be a target of the predetermined processing. Each of the plurality of client terminals transmits data relating to an event that occurred in the client terminal, to the second queue based on a second transmission rule for transmission of data to the second queue in a case where it is determined that an amount of data transmitted from the client terminal to the first queue per unit time exceeds a predetermined value.

12 Claims, 12 Drawing Sheets

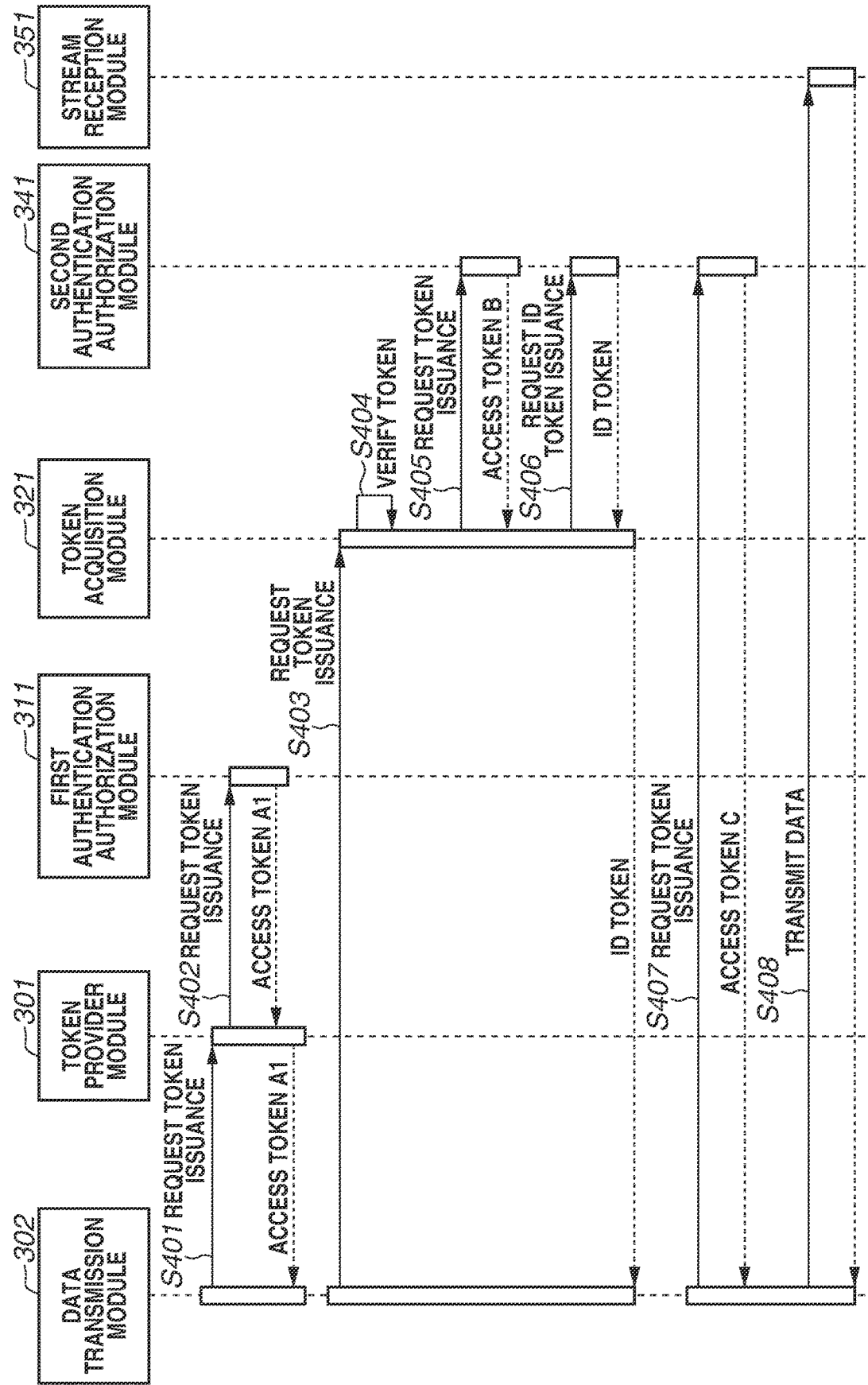

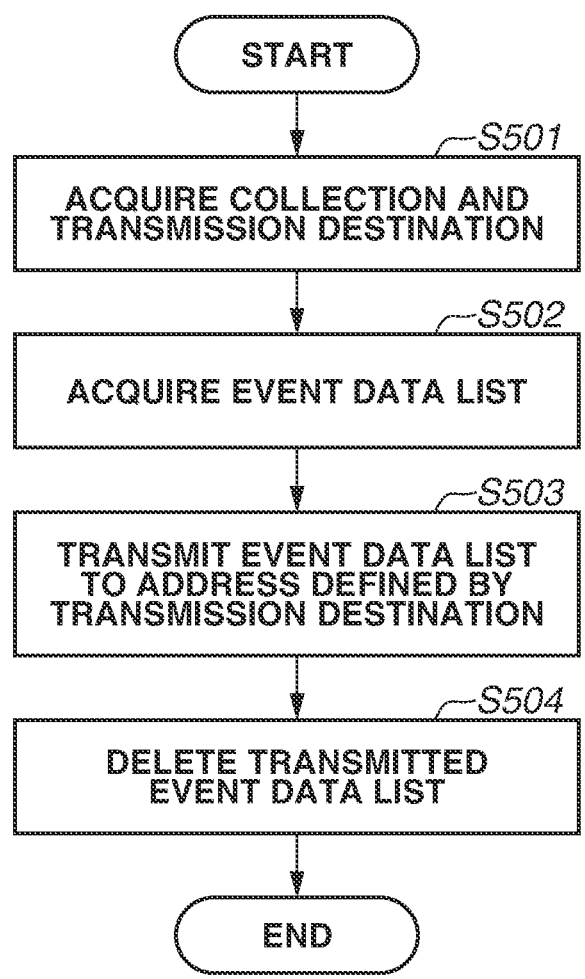

FIG.6A

```
{
    "collections": [
        {
            "collection": "Error",     ~602
            "fire": "realtime",        ~603
            "route": "stream"          ~604
        }
    ]
}
```
601

FIG.6B

```
{
    "collections": [
        {
            "collection": "Error",         ~602
            "fire": "ealtime",             ~603
            "route": "irregularStream"
        }                                    )
    ]                                      604
}
```
601

FIG.7

```
{
    "event": {
        "id": "1235465423",            ~702
        "deviceSerial": "AAA12345",    ~703
        "collection": "Error",         ~704
        "eventName": "sensorError",    ~705
        "occurDateTime": 2018/08/31 00:00:01
    }                                        706
}
```
701

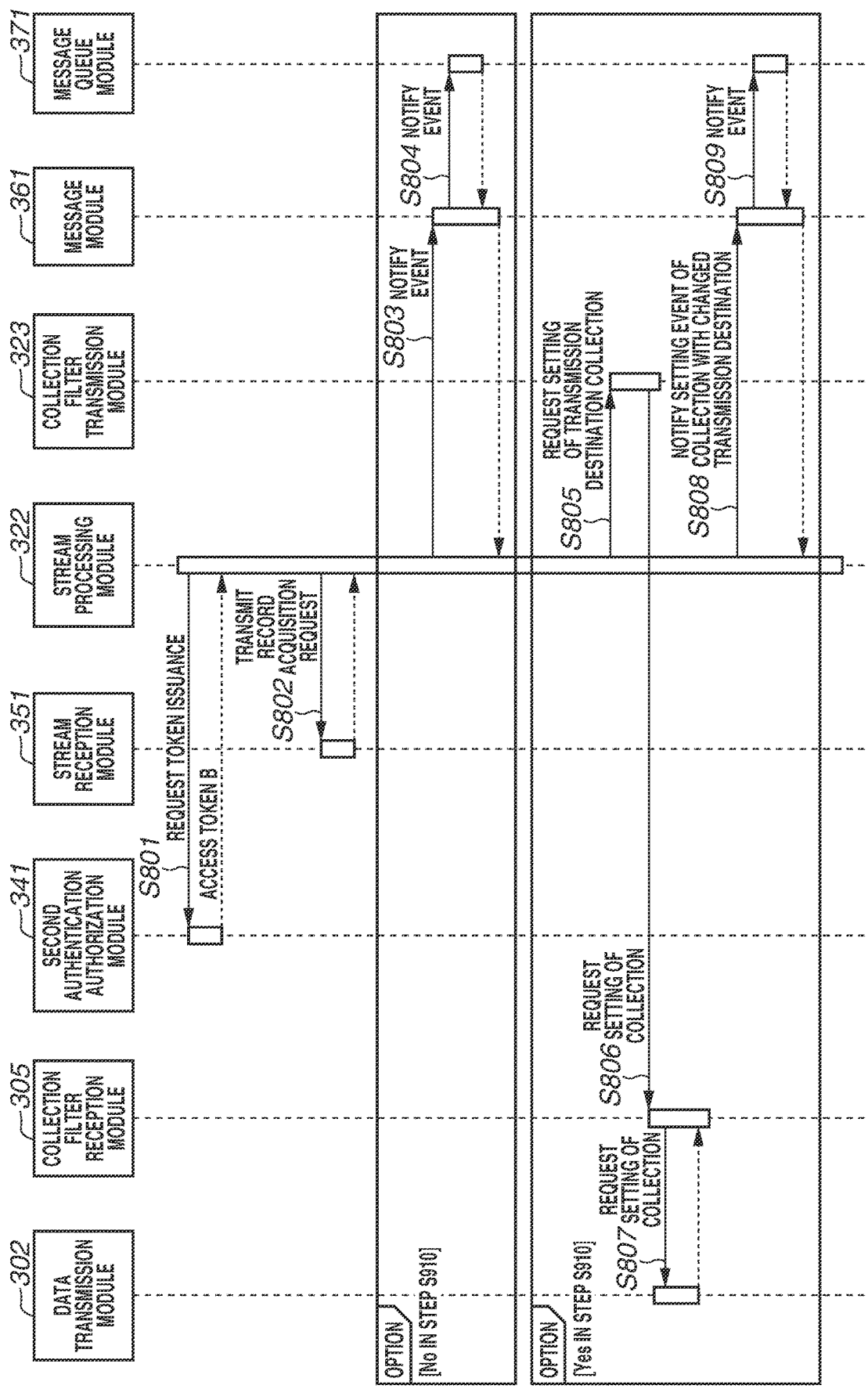

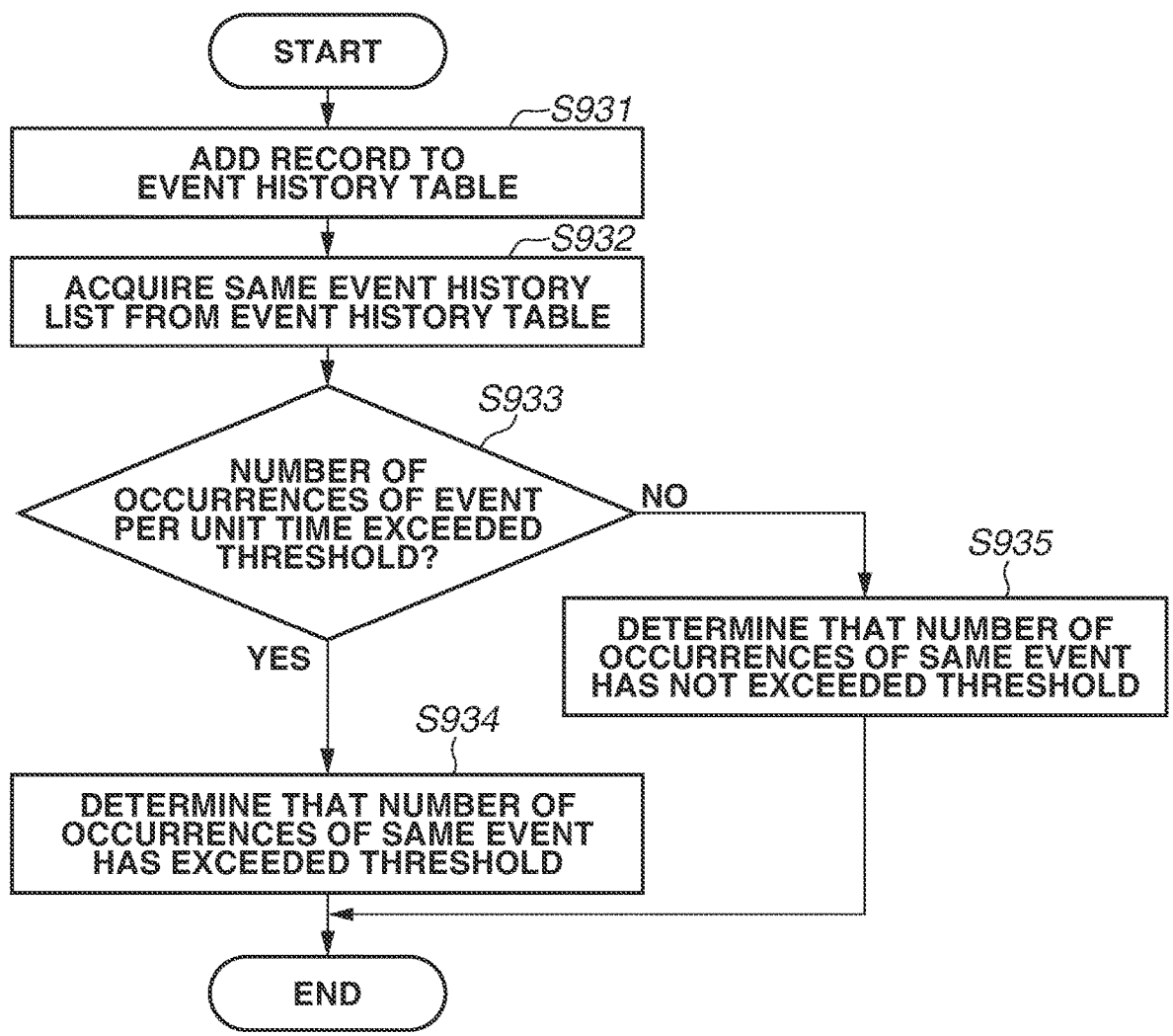

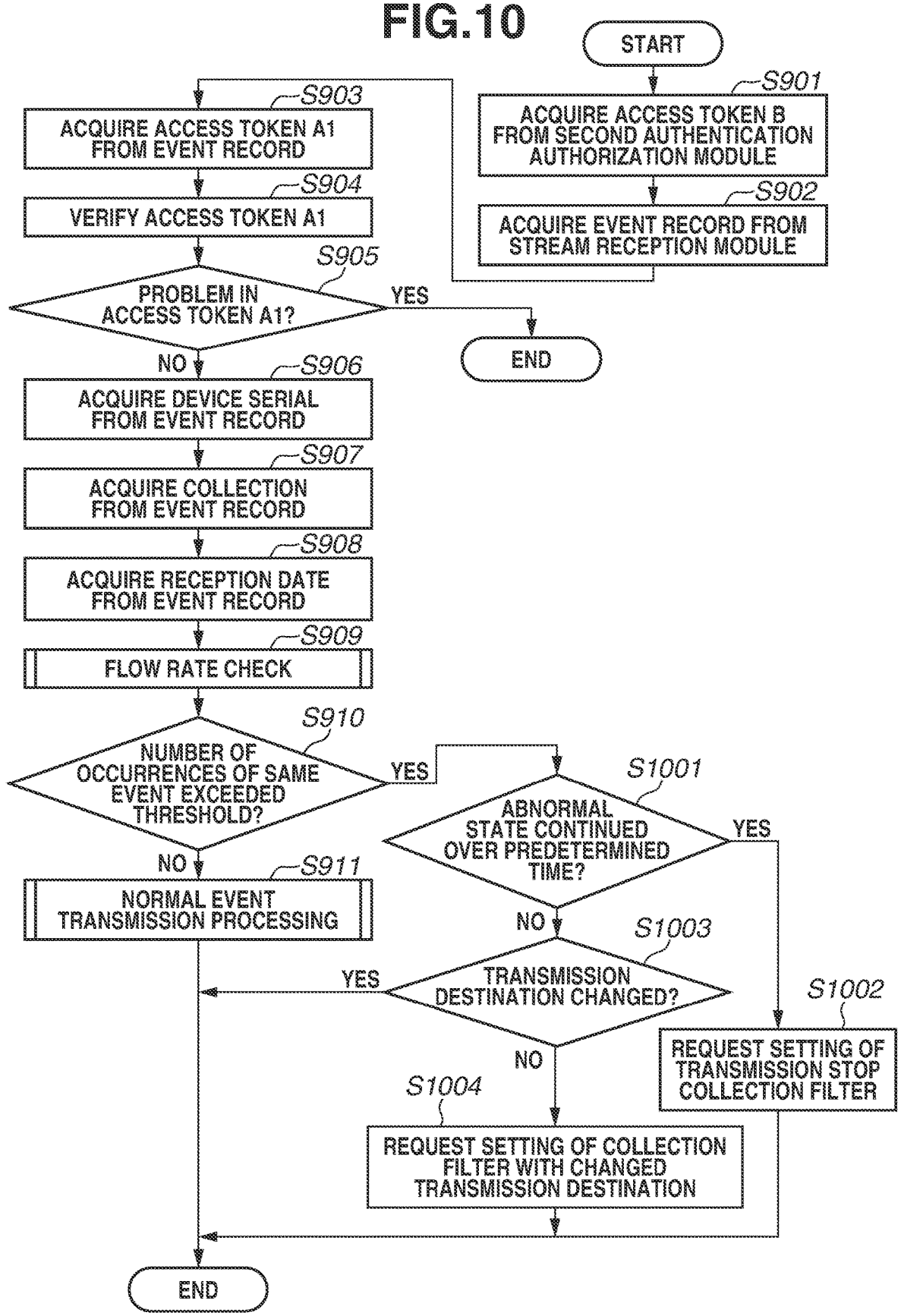

SYSTEM AND CONTROL METHOD TO DIRECT TRANSMISSION OF EVENT DATA TO ONE OF A PLURALITY OF RECEPTION QUEUES

BACKGROUND OF THE INVENTION

Field of the Disclosure

The present disclosure relates to a system that includes a plurality of client terminals and a reception service system receiving data from the plurality of client terminals, and to a control method.

Description of the Related Art

In recent years, a system realizing "Internet of Things" (hereinafter, referred to as IoT) that connects home electric appliances, automobiles, and the like as client terminals to the Internet is used. Further, multifunctionalization of an image forming apparatus progresses, and a multifunctional printer also can serve as an IoT client.

The IoT system collects and analyzes a huge amount of data such as information on a sensor connected to the IoT client, thereby providing a service and added value to the IoT client (also simply referred to as client) and a user using the IoT client. The IoT system receives the above-described huge amount of data from a huge number of clients.

In processing such a huge amount of data in real time, it is important to monitor varied traffic every moment. It is difficult for an existing resource server including an application programmable interface (API) to singularly receive data of such traffic. Accordingly, to collect the data, a service (reception service) dedicated for data reception is used, and processing providing a service (resource service) is separated as asynchronization processing, which becomes common.

Each of the IoT clients transmits data to the reception service. The reception service buffers the data and supplies the data from the buffer in response to a data reception request from the resource service. The resource service can concentrate on data processing without considering the huge amount of varied traffic from the IoT clients, in the above-described manner.

Further, a plurality of resource services to which data is transferred from the stream reception service may be present. The resource services perform processing in asynchronization with the stream reception service. Therefore, in development of the IoT system, a resource service can be flexibly added for each type of the service to be provided.

Japanese Patent Application Laid-Open No. 2016-163242 discuses a data collection system in which a server that receives, from a gateway, sensor data output from a sensor as a monitoring target, performs processing based on the sensor data, thereby predicting failure of the monitoring target. Japanese Patent Application Laid-Open No. 2016-163242 discuses that, when occurrence of abnormality or a sign of abnormality is detected in the monitoring target, the server transmits a collection rule to increase the types of the sensor data to be collected and collection frequency, to the gateway.

For example, there is a case where a client on which failure of a hard disk, or the like has occurred transmits a large amount of abnormal data to the reception service with frequency higher than normal frequency. However, the resource amount of the reception service processing the data is limited. Accordingly, if a part of the clients transmits a large amount of data with frequency higher than the normal frequency, the amount of data to be processed by the reception service is increased, which may cause delay in processing of data from the other normal clients in the reception service.

SUMMARY

Therefore, the present disclosure is directed to a mechanism that prevents delay in processing of data from clients in the reception service in a case where a large amount of data is transmitted from the other predetermined client.

According to an aspect of the present disclosure, a system includes a plurality of client terminals, and a reception service system receiving data from the plurality of client terminals. The reception service system includes a first queue configured to receive data to be a target of predetermined processing, and a second queue configured to receive data not to be a target of the predetermined processing. Each of the plurality of client terminals transmits data relating to an event that occurred in the client terminal, to the second queue based on a second transmission rule for transmission of data to the second queue in a case where it is determined that an amount of data transmitted from the client terminal to the first queue per unit time exceeds a predetermined value.

Further features of the present disclosure will become apparent from the following description of exemplary embodiments with reference to the attached drawings.

BRIEF DESCRIPTION OF THE DRAWINGS

FIG. 4 is a sequence diagram of processing until a client terminal transmits data to a stream reception server.
FIG. 5 is a flowchart of the processing by the client terminal to transmit data to the stream reception server.
FIGS. 6A and 6B are diagrams each illustrating an example of a collection filter.
FIG. 7 is a diagram illustrating an example of event data.
FIG. 8 is a sequence diagram of processing by a stream processing module.
FIGS. 9A, 9B, and 9C are flowcharts of the processing by the stream processing module.
FIG. 10 is a flowchart of processing by the stream processing module according to a second exemplary embodiment.

DESCRIPTION OF THE EMBODIMENTS

Some exemplary embodiments of the present disclosure are described below with reference to drawings.

In a first exemplary embodiment, applications are installed in each server on the Internet. The applications each cooperate with a client terminal, and provide various functions. An entity providing such functions is referred to as a service, and providing of the functions to the client terminal is referred to as providing of the service.

Figure 1:
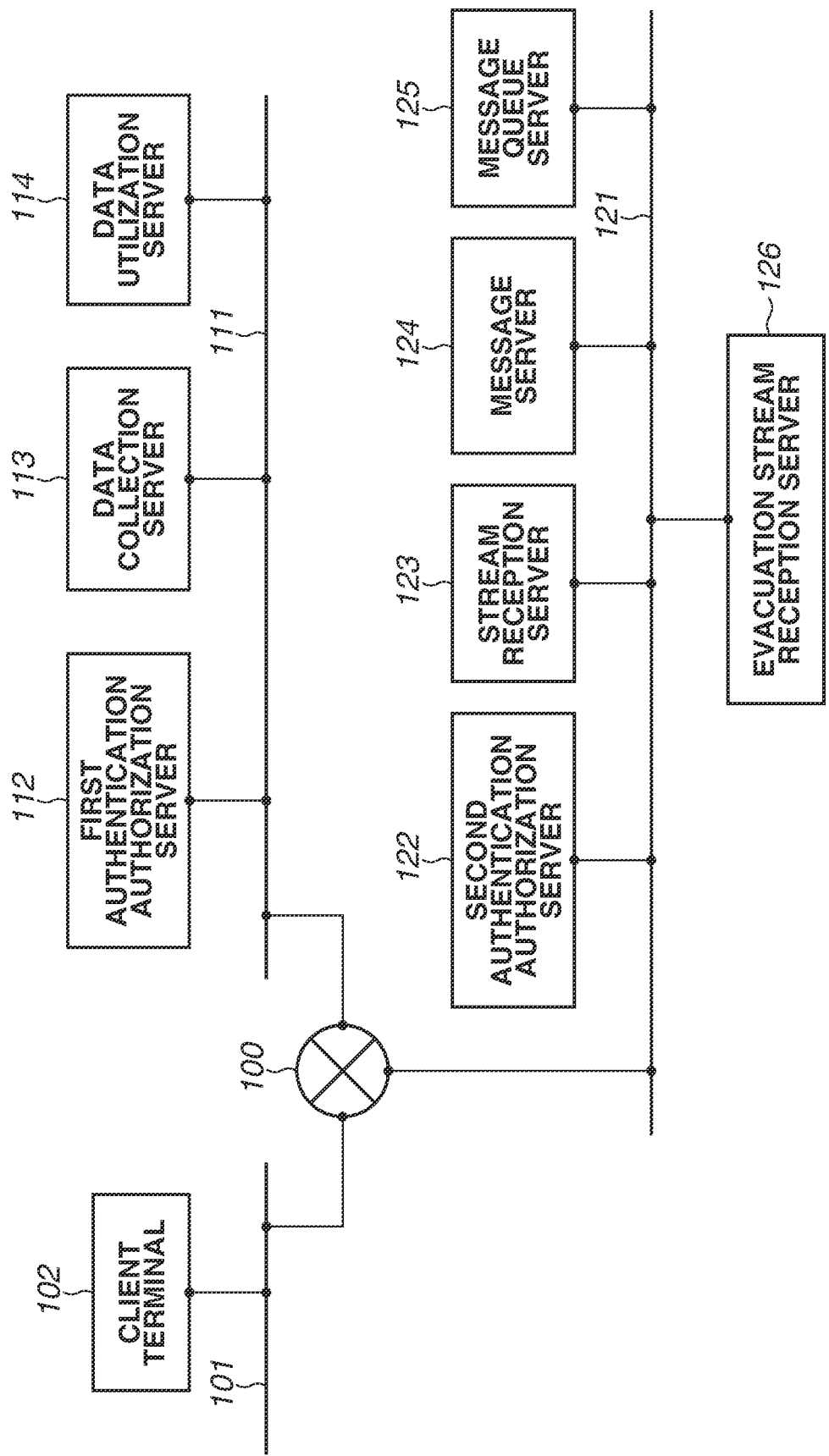
FIG. 1 is a diagram illustrating an entire system.

FIG. 1 is a diagram illustrating an overall configuration of a data collection base system that is an information processing system according to the present exemplary embodiment.

A network 100 is a wide area network (hereinafter, referred to as WAN) that connects components of this system. Networks 101, 111, and 121 are local area networks (hereinafter, referred to as LANs) that connect the components of this system. A client terminal 102 is an apparatus that uses the service, such as a personal computer, a mobile terminal, or an image forming apparatus.

A first authentication authorization server 112 realizes authentication/authorization necessary for the client terminal 102 to use the service. The first authentication authorization server 112 controls access of the client terminal 102 to a data collection server 113 and a data utilization server 114.

The data collection server 113 provides a service to collect data of the client terminal 102 and a service to notify the collected data to the data utilization server 114 described below. A stream reception server 123 described below is used to collect the data, and a message server 124 described below is used to notify the data.

The data utilization server 114 provides a service using the data collected by the data collection server 113. The data utilization server 114 provides, for example, a service to back up the data of the client terminal 102, and a service to analyze information on a sensor connected to the client terminal 102. The data utilization server 114 acquires the data from the data collection server 113 by acquiring a message from a message queue server 125 described below.

The data utilization server 114 may be realized by an application executed by a serverless architecture. More specifically, the service is provided by a cloud computing service that is an event-driven computing service performing light processing in response to an event occurred with respect to a specific computing resource. Examples of the service include Amazon Web Service (AWS) Lambda, Google Cloud Functions, and Microsoft Azure Functions.

A second authentication authorization server 122 is different from the first authentication authorization server 112, and realizes authentication/authorization to the stream reception server 123, the message server 124, and the message queue server 125 to control access.

The stream reception server 123 performs stream data reception, and receives stream data transmitted from the client terminal 102.

The message server 124 notifies an event generated by each of the servers configuring the system, as a message. The message server 124 performs push notification of the event generated by any of the components of the system, to a registered notification destination, based on the registered notification destination and a notification condition. The message queue server 125 stores the event from the server that configures the system and transmits the event, as a message, and provides the message to a corresponding server.

An evacuation stream reception server 126 includes a function similar to the function of the stream reception server 123, and receives the stream data transmitted from the client terminal 102. The evacuation stream reception server 126 receives data from one or more client terminals in an abnormal state each transmitting a large amount of data. The data received by the stream reception server 123 is to be stored in the message queue server 125 by the message server 124. In contrast, the data received by the evacuation stream reception server 126 is not to be stored in the message queue server 125 by the message server 124.

In particular, the stream reception server 123, the data collection server 113, and the message server 124 function as a reception service system according to the present exemplary embodiment. Further, the message queue server 125 and the data utilization server 114 function as a resource service system according to the present exemplary embodiment. In the present exemplary embodiment, each of the client terminal 102, and the servers 112 to 114 and 122 to 125 is illustrated as a single apparatus; however, each of the client terminal 102, and the servers 112 to 114 and 122 to 125 may include a plurality of apparatuses.

Figure 2:
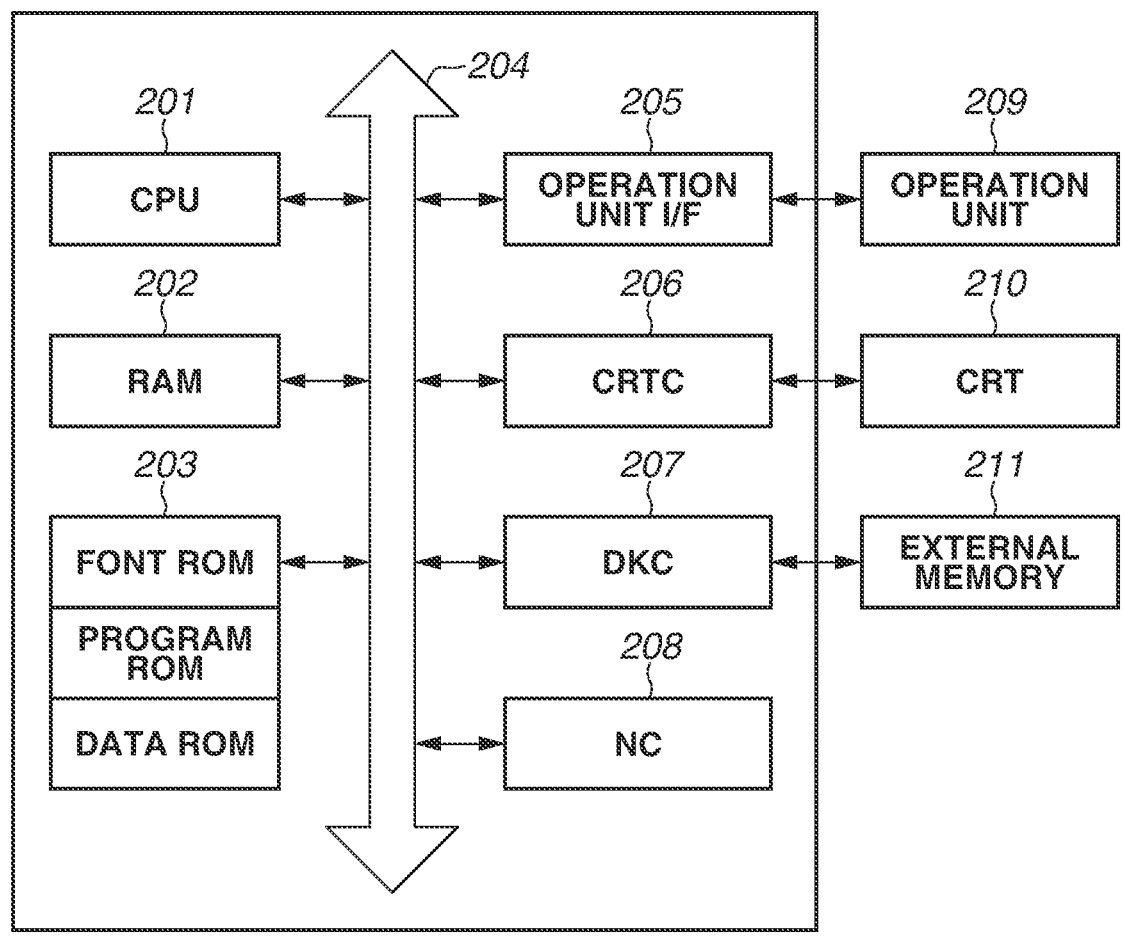
FIG. 2 is a diagram illustrating a hardware configuration.

FIG. 2 illustrates a common hardware configuration of an information processing apparatus configuring each of the client terminal 102 and the servers 112 to 114 and 122 to 125 according to the present exemplary embodiment. As for the servers 112 to 114 and 122 to 125, functions of hardware of a computer illustrated in FIG. 2 are realized as application software by virtual machine software, and takes a behavior similar to a behavior of a physical hardware element.

A central processing unit (CPU) 201 executes programs such as an operating system and an application that are stored in a program read-only memory (ROM) of a ROM 203 or are loaded from an external memory 211 such as a hard disk to a random access memory (RAM) 202. Further, the CPU 201 controls units connected to a system bus 204. Processing in each of sequences described below is realized by the program executed by the CPU 201.

The RAM 202 functions as a main memory, a work area, etc. for the CPU 201.

An operation unit interface (I/F) 205 controls input from an operation unit 209.

A cathode-ray tube controller (CRTC) 206 controls display of a CRT display 210.

A disk controller (DKC) 207 controls data access in the external memory 211 that stores various kinds of data, such as the hard disk.

A network controller (NC) 208 performs communication control processing with the severs and other apparatuses connected through the WAN 100 or the LAN 101, 102, or 103.

In the whole of the following description, an execution subject on the hardware is the CPU 201, and a subject on the software is an application program installed in the external memory 211, unless otherwise noted.

Figure 3:
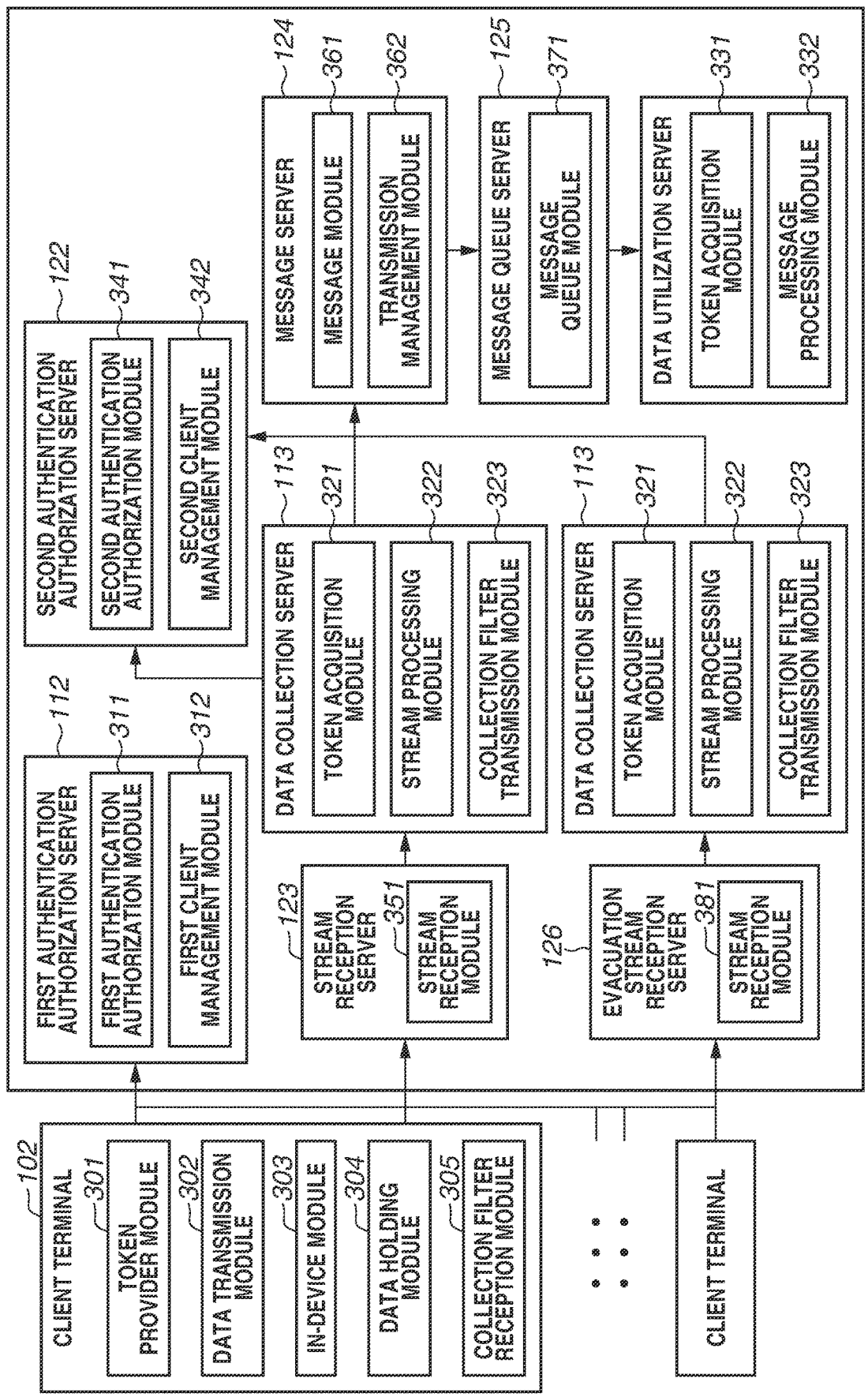
FIG. 3 is a diagram illustrating a software configuration.

FIG. 3 is a diagram illustrating a software configuration of each of the client terminal 102 and the servers 112 to 114 and 122 to 125 according to the present exemplary embodiment. The functions are realized when respective modules are executed.

The client terminal 102 includes a token provider module 301, a data transmission module 302, an in-device module 303, a data holding module 304, and a collection filter reception module 305.

The token provider module 301 performs authentication request of the client terminal and issuance request and acquisition of an access token with respect to the first authentication authorization server 112.

The data transmission module 302 uses the services provided by the data collection server 113, and transmits event data of the client terminal 102 to the stream reception server 123. The event data transmitted by the data transmission module 302 to the stream reception server 123 is event data stored in the data holding module 304 described below and is transmitted based on description of a collection filter. The data held by the event data is described below with reference to FIG. 7.

The collection filter is a file in which a transmission rule to transmit which event data with how frequency among event data held by the data holding module 304 is defined. The data held by the collection filter is described below with reference to FIGS. 6A and 6B.

The in-device module 303 is a module configuring the client terminal 102, and stores event data in the data holding module 304 described below when various kinds of event data including a device state occurs. Examples of the various kinds of event data include a start event and an end event when a job is executed, and an abnormality event when abnormality of a sensor, or the like is detected. The data holding module 304 holds the event data from the in-device module 303. The collection filter reception module 305 receives the collection filter from a collection filter transmission module 323 described below.

The first authentication authorization server 112 includes a first authentication authorization module 311 and a first client management module 312. The first authentication authorization module 311 performs processing with respect to the authentication request from the client terminal 102, and authorization processing of the authenticated client terminal 102. The first client management module 312 manages an identification (ID) and a secret as authentication information on the client terminal subjected to the authentication processing and the authorization processing. Further, the first client management module 312 provides an API that deletes the managed authorization information on the client terminal 102 in response to a request from the other server.

The data collection server 113 includes a token acquisition module 321 and a stream processing module 322. The token acquisition module 321 acquires, from the second authentication authorization server 122, a token for the data collection server 113 and the client terminal 102 to use the services of the servers 123 to 125. The detail thereof is described in a sequence of FIG. 4 described below.

The stream processing module 322 processes the stream data in the stream reception server 123. The stream processing module 322 notifies the data utilization server 114 of the contents of the received stream data as an event through the message server 124 and the message queue server 125. The detail thereof is described with reference to a sequence diagram of FIG. 8 and flowcharts of FIGS. 9A, 9B, and 9C. The collection filter transmission module 323 transmits the collection filter to the client terminal 102.

The data utilization server 114 includes a token acquisition module 331 and a message processing module 332. The token acquisition module 331 acquires, from the second authentication authorization server 122, a token for the data utilization server 114 to use the services of the servers 123 to 125. The message processing module 332 processes the message held by the message queue server 125. The message processing module 332 processes the message to receive and process notification of the event from the stream processing module 322.

The second authentication authorization server 122 includes a second authentication authorization module 341 and a second client management module 342. The second authentication authorization module 341 performs processing with respect to the authentication request from the client terminal 102 as a client and the servers 113 and 114, and authorization processing of the authenticated client. The second client management module 342 manages IDs and secrets as the authentication information on the servers 113 and 114 subjected to the authentication processing and the authorization processing.

The steam reception server 123 includes a stream reception module 351. The stream reception module 351 provides a function to receive and hold stream information.

The message server 124 includes a message module 361 and a transmission management module 362. The message module 361 provides a function to transmit a message. The transmission management module 362 provides a function to manage a transmission destination of the message received by the message module 361.

The message queue server 125 includes a message queue module 371. The message queue module 371 provides a function to hold the received message in a queue.

The first authentication authorization server 112 manages a client ID for unique identification of the client, a public key for authentication of the client, and a device serial for unique identification of the client terminal 102, in a client management table of Table A.

The first authentication authorization module 311 authenticates the client terminal 102 based on the client ID and the public key, and specifies the device serial of the client terminal 102.

TABLE A

Client management table (first authentication authorization server 112)

| Client ID | Public key | Device serial |
|---|---|---|
| client1 | publickey1 | 123456789 |
| client2 | publickey2 | 987654321 |

The token provider module 301 of the client terminal 102 holds a client ID and a private key for the own terminal as illustrated in a client management table of Table B.

TABLE B

Client management table (client terminal 102)

| Client ID | Private key |
|---|---|
| client1 | privatekey1 |

The present exemplary embodiment is described on the premise of authentication using the client IDs and asymmetric keys; however, the authentication method is not particularly limited as described above, and another method such as authentication using the client ID and the secret may be used.

Likewise, the second authentication authorization server 122 manages the client ID for unique identification of the server and the secret for authentication of the server as illustrated in a client management table of Table C. The second authentication authorization module 341 authenticates the server based on the information.

TABLE C

Client management table (second authentication authorization server 122)

| Client ID | Secret |
|---|---|
| clientA | secretA |
| clientB | secretB |

The token acquisition module 321 of the data collection server 113 and the token acquisition module 331 of the data utilization server 114 each hold the client ID and the secret of the client, the authentication of which is to be controlled, as illustrated in a client management table of Table D.

TABLE D

| Client management table (data collection server 113 and data utilization server 114) | |
|---|---|
| Client ID | Secret |
| clientA | secretA |

FIG. 4 is a sequence diagram illustrating a flow of normal processing in which the client terminal 102 transmits an event to the stream reception server 123.

In step S401, the data transmission module 302 of the client terminal 102 transmits a token issuance request to the token provider module 301. The token provider module 301 uses the client ID and the private key managed in Table B to create assertion, and generates a token issuance request with the assertion. In the present exemplary embodiment, the assertion is assumed to be JSON Web Token (hereinafter, referred to as JWT) that is defined by Request for Comments (RFC) 7519, and JWT includes information such as the client ID.

In step S402, the token provider module 301 transmits the assertion to the first authentication authorization module 311 of the first authentication authorization server 112.

The first authentication authorization module 311 acquires, from the table A, the public key corresponding to the client terminal that has transmitted the assertion in step S402, and performs signature verification of the assertion. In a case where the verification is successful, the first authentication authorization module 311 issues an access token A1, and transmits the access token A1 as a response. The token provider module 301 that has received the response transmits the access token A1 to the data transmission module 302 as a response. The access token A1 is used by the client terminal 102 to access the data collection server 113, access to which is controlled by the first authentication authorization server 112.

In the present exemplary embodiment, the access token is assumed to be the JWT, and includes information such as the client ID and the device serial of the client terminal 102, and an expiration date of the token.

In step S403, the data transmission module 302 uses the access token A1 received as the response in step S402, to transmit a token issuance request to the token acquisition module 321 of the data collection server 113.

In step S404, the token acquisition module 321 verifies the access token A1 included in the received token issuance request. The token acquisition module 321 holds a public key to verify the JWT issued by the first authentication authorization module 311, and authorizes the client by verifying the JWT. In the verification of the JWT, the token acquisition module 321 uses the public key to verify whether the signature of the JWT is valid, and further verifies whether the JWT is within a valid period. As a result of the verification of the access token A1, the token acquisition module 321 can acquire the client information, and identify the client terminal 102 as the access source based on the device serial. Alternatively, the token acquisition module 321 may request the first authentication authorization module 311 to verify the token, and may acquire a result of the verification and the client information. The token acquisition module 321 that has received the request performs processing with respect to the received request in steps S405 and S406.

In step S405, the token acquisition module 321 transmits a token issuance request to the second authentication authorization module 341 of the second authentication authorization server 122. The token issuance request is transmitted together with the client ID and the secret in Table D. In a case where the client ID and the secret managed in Table C are respectively coincident with the client ID and the secret included in the token issuance request, the second authentication authorization module 341 that has received the token issuance request issues an access token B and transmits the access token B as a response. The access token B is used for access to the second authentication authorization server 122.

In step S406, the token acquisition module 321 that has acquired the access token B transmits an ID token issuance request to the second authentication authorization module 341. In the ID token issuance request, the token acquisition module 321 transmits the access token B and the client ID of the client terminal 102 acquired from the result of the verification in step S404. The second authentication authorization module 341 issues an ID token for the received client ID.

The ID token is a token certifying that the client terminal 102 has been certainly authenticated. In the present exemplary embodiment, the token acquisition module 321 checks authentication of the client terminal 102 by verifying the access token A1 in step S404. The second authentication authorization module 341 establishes trusting relationship with the token acquisition module 321 by providing the client ID and the secret to the token acquisition module 321, and trusts the result of the authentication of the client terminal 102 by the token acquisition module 321. The second authentication authorization module 341 issues the ID token based on the trust. Further, the ID token is assumed to be in the JWT format, and the second authentication authorization module 341 can verify the ID token by verifying the signature.

In step S407, the data transmission module 302 of the client terminal 102 that has received the ID token transmits a token issuance request to the second authentication authorization module 341 of the second authentication authorization server 122. The request includes the ID token acquired in step S404. The second authentication authorization module 341 that has received the request verifies the ID token, and issues and transmits an access token C as a response. The access token C is used for access to the stream reception server 123.

In step S408, the data transmission module 302 of the client terminal 102 that has received the access token C transmits data to the stream reception module 351 of the stream reception server 123. In this data transmission, the access token C and the access token A1 are transmitted. The stream reception module 351 that has received the data verifies the access token C. In a case where there is no problem, the stream reception module 351 holds a pair of the access token A1 and the data.

The client terminal 102 completes data transmission to the stream reception server 123 in the above-described manner.

The data transmission processing described in step S408 of FIG. 4 is described in detail with reference to a flowchart of FIG. 5. FIG. 5 is a flowchart of the processing by the data transmission module 302 to transmit event data to the stream reception module 351 based on a collection filter 601.

The collection filter 601 is data as illustrated in FIGS. 6A and 6B. FIG. 6A illustrates an example of the collection filter in a normal mode, and FIG. 6B illustrates an example of the collection filter when a transmission destination is changed. In the collection filter 601, a collection 602 that represents a data group to be collected, a transmission timing 603 when the event data is transmitted to the stream reception module 351, and a route 604 that represents a transmission destination are described.

The example of FIG. 6A illustrates that error data is successively transmitted to the stream reception module 351 represented by an identifier "stream" every time error data is generated. The example of FIG. 6B and the example of FIG. 6A are different in that the value set in the route is "stream" or "irregularStream". Changing the value of the route makes it possible to change the transmission destination of the data represented by a certain collection.

The flowchart of FIG. 5 is executed at timing when the data transmission module 302 transmits the event data based on the description of the collection file 601. In the execution, the collection 602 and the route 604 of the executed collection filter 601 are passed as arguments.

In step S501, the data transmission module 302 acquires the collection 602 and the route 604 passed as the arguments.

In step S502, the data transmission module 302 acquires an event data list corresponding to the collection acquired in step S501, from event data 701 held by the data holding module 304. The event data 701 is data illustrated in FIG. 7, and an event ID 702 for unique identification of an event in the client terminal 102, a device serial 703 for unique identification of the client terminal 102, and a collection 704 on which the event has occurred are described in the event data 701. Further, in the event data 701, an occurred event name 705 and an occurrence date and time 706 are described.

In step S503, the data transmission module 302 transmits the event data list acquired in step S502 together with the access token C and the access token A1, to the stream reception module 351. The transmission destination at this time is an address defined by the transmission destination acquired in step S501.

In step S504, the data transmission module 302 deletes the event data list transmitted in step S503, from the data holding module 304.

As the flowchart of FIG. 5 described above, the data transmission module 302 can transmit the event data included in the designated collection, to the transmission destination instructed by the route.

Table E illustrates an example of the data held by the stream reception server 123 at the time when the processing illustrated in FIG. 4 and FIG. 5 is completed. The ID for unique identification of the data, the data reception date and time, the received access token, the device serial, and the information on the collection are managed and stored as one record in the stream reception server 123, in order of the reception date.

TABLE E

Stream data holding table

| ID | Reception date and time | Access token | Device serial | Collection |
|----|-------------------------|--------------|---------------|------------|
| 1  | 2018 Aug. 31 00:00:01   | A1           | AAA12345      | Error      |
| 2  | 2018 Aug. 31 00:00:02   | A1           | AAA12345      | Error      |
| 3  | 2018 Aug. 31 00:00:03   | A1           | AAA12345      | Error      |
| 4  | 2018 Aug. 31 00:00:05   | A1           | AAA12345      | Error      |
| 5  | 2018 Aug. 31 00:00:06   | A1           | AAA12345      | Error      |
| 6  | 2018 Sep. 5 13:04:00    | A1           | AAA12345      | Error      |

The processing by the stream processing module 322 of the data collection server 113 is described below with reference to FIG. 8 and FIGS. 9A, 9B, and 9C.

FIG. 8 and FIGS. 9A, 9B, and 9C are a sequence diagram and flowcharts illustrating a series of flow of the processing provided by the stream processing module 322 of the data collection server 113.

The detail of the processing is described with reference to the flowcharts of FIGS. 9A, 9B, and 9C, and cooperation with the other modules is described with reference to the sequence diagram. The processing is periodically performed by the data collection server 113.

In step S901 (S801), the stream processing module 322 transmits a token issuance request to the second authentication authorization module 341. The processing is similar to the processing in step S405. The second authentication authorization module 341 that has received the token issuance request issues the access token B necessary for access to the stream reception server 123 and the message server 124, and transmits the access token B to the stream processing module 322 as a response.

In step S902 (S802), the stream processing module 322 transmits a record acquisition request together with the access token B to the stream reception module 351 of the stream reception server 123. The stream reception module 351 that has received the record acquisition request verifies the access token B. In a case where there is no problem, the stream reception module 351 sequentially transmits records managed in the stream data holding table of Table E in the chronological order of the reception date, to the stream processing module 322 as a response. The received record is referred to as transition event record.

In step S903, the stream processing module 322 acquires the access token A1 from the event record received in step S902. In step S904, the stream processing module 322 verifies the access token A1 acquired in step S903. In the verification, the signature and the valid period of the access token A1 are checked.

In step S905, in a case where there is no problem in the verification by the stream processing module 322 in step S904 (NO in step S905), the processing proceeds to step S906. In a case where there is a problem (YES in step S905), the processing ends. In step S906, the stream processing module 322 acquires the device serial of the event record acquired in step S902. In step S907, the stream processing module 322 acquires a collection of the event record acquired in step S902. In step S908, the stream processing module 322 acquires a reception date and time of the event record acquired in step S902.

In step S909, the stream processing module 322 checks a flow rate of the data transmitted from one client terminal 102 to the reception service system per unit time. In the present exemplary embodiment, the flow rate check for data of the same event and the same collection is described; however, the data is not limited thereto.

An example of the flow rate check is described with reference to the flowchart of FIG. 9B. In step S931, the stream processing module 322 adds the device serial, the collection, and the reception date and time acquired in steps S906 to S908 as one record to an event history table. The event history table is a table managing the histories of the events processed in the past, and Table F illustrates an example of the event history table. In the event history table, the record stored for one hour since the reception date and time is periodically deleted.

TABLE F

Event history table (data collection server 113)

| Device serial | Collection name | Reception date and time |
|---|---|---|
| AAA12345 | Error | 2018 Aug. 31 00:00:01 |
| AAA12345 | Error | 2018 Aug. 31 00:00:02 |
| AAA12345 | Error | 2018 Aug. 31 00:00:03 |

In step S932, the stream processing module 322 acquires an event history list corresponding to the device serial, the collection, and the reception date and time acquired in steps S906 to S908, from the event history table of Table F.

In step S933, the stream processing module 322 checks whether the number of occurrences of event per unit time in the event history list acquired in step S932 has exceeded a threshold. For example, the stream processing module 322 checks whether the number of occurrences of the same event per one minute exceeds a threshold 100. In a case where the number of occurrences of event has exceeded the threshold (YES in step S933), a return value representing that the number of occurrences of event has exceeded the threshold is returned in step S934. In a case where the number of occurrences of event has not exceeded the threshold (NO in step S933), a return value representing that the number of occurrences of event has not exceeded the threshold is returned in step S935.

In a case where the stream processing module 322 determines that the number of occurrences of event has exceeded the threshold as a result in step S910 (YES in step S910), the processing proceeds to step S912. In a case where the stream processing module 322 determines that the number of occurrences of event is lower than or equal to the threshold (NO in step S910), the processing proceeds to step S911. In step S911, the stream processing module 322 determines that the number of occurrences of the same event is not large in one client terminal 102, and performs normal event notification processing to the data utilization server 114.

More specifically, in step S803, the stream processing module 322 transmits the occurred event and the access token B to the message server 124. In step S804, the message module 361 of the message server 124 verifies the access token B received in step S803. In a case where there is no problem, the message module 361 transmits the event to the message queue server 125 based on the setting of the transmission management module 362. The processing then ends.

Table G illustrates an example of transmission management data held by the transmission management module 362.

TABLE G

Transmission management data table (message server 124)

| Topic ID | Notification destination client ID |
|---|---|
| Error | client1 |
| Alarm | client1 |

As the transmission management data, the topic ID for unique identification of a storage destination of the message and the client ID as a notification destination of the message that are associated with each other is stored as one record. Table H illustrates an example of the data stored by the message module 361.

TABLE H

Message table (message server 124)

| Topic ID | Message |
|---|---|
| Error | sensorError |

The message module 361 associates the received event message with the corresponding topic ID, and stores the message and the topic ID as one record in the message table.

In the case where the stream processing module 322 determines that the number of occurrences of the same event in one client terminal 102 is large, the processing proceeds to step S912 (S805). In step S912, the stream processing module 322 requests the collection filter transmission module 323 to set the collection in which the route has been changed, to the client terminal 102.

In the present exemplary embodiment, the collection filter transmission module 323 transmits the collection filter to the collection filter reception module 305 as described above. As another exemplary embodiment, the collection filter transmission module 323 instructs a state management server (not illustrated) that manages state information on the client terminal, to set the collection filter. When the client terminal and the state information on the client terminal managed by the state management server are synchronized with each other, the preset collection filter is transmitted to the collection filter reception module 305. This makes it possible to apply the setting change of the collection filter to the client terminal. For example, in AWS IoT that is a service provided by AWS, a service called Device Shadow may be used to realize the processing.

In step S806, the collection filter transmission module 323 transmits the collection filter in which the transmission destination has been changed, to the collection filter reception module 305 of the client terminal 102. The collection filter in which the transmission destination has been changed is the collection filter 601 illustrated in FIG. 6B. Alternatively, the client terminal 102 may previously hold the collection filter 601 illustrated in FIG. 6B, and the collection filter transmission module 323 may instruct the client terminal 102 to change the collection filter in step S806.

In step S807, the collection filter reception module 305 requests the data transmission module 302 to set the collection filter received in step S806. In step S808, the stream processing module 322 notifies the message module 361 of an event indicating that the collection filter with the changed transmission destination has been set. In step S809, the message module 361 transmits the event to the message queue server 125 based on the setting of the transmission management module 362. The processing then ends.

Changing the transmission destination of the client that transmits a large number of events from the normal destination in the above-described manner makes it possible to exclude the events from the target of the normal event transmission processing. Even in the case where the transmission destination of the client is the same as the normal destination, it is possible to exclude the events from the target of the normal event transmission processing by managing the information on the client and the collection by the database or the like. However, it is necessary to check whether to exclude each of the large number of events from the target, which applies a large load to the data collection server 113 that acquires the data from the stream reception server 123. Therefore, the evacuation stream reception server 126 receives the data from the client that transmits the large number of events, which can reduce the load on the data collection server 113 that acquires the data from the stream reception server 123.

The client terminal 102 that has received the collection filter in which the transmission destination has been changed transmits the collection instructed by the collection filter, to the changed transmission destination. The transmission flow is similar to the flow described with reference to FIG. 4 and FIG. 5. Therefore, description of the flow is omitted.

Figure 9A:
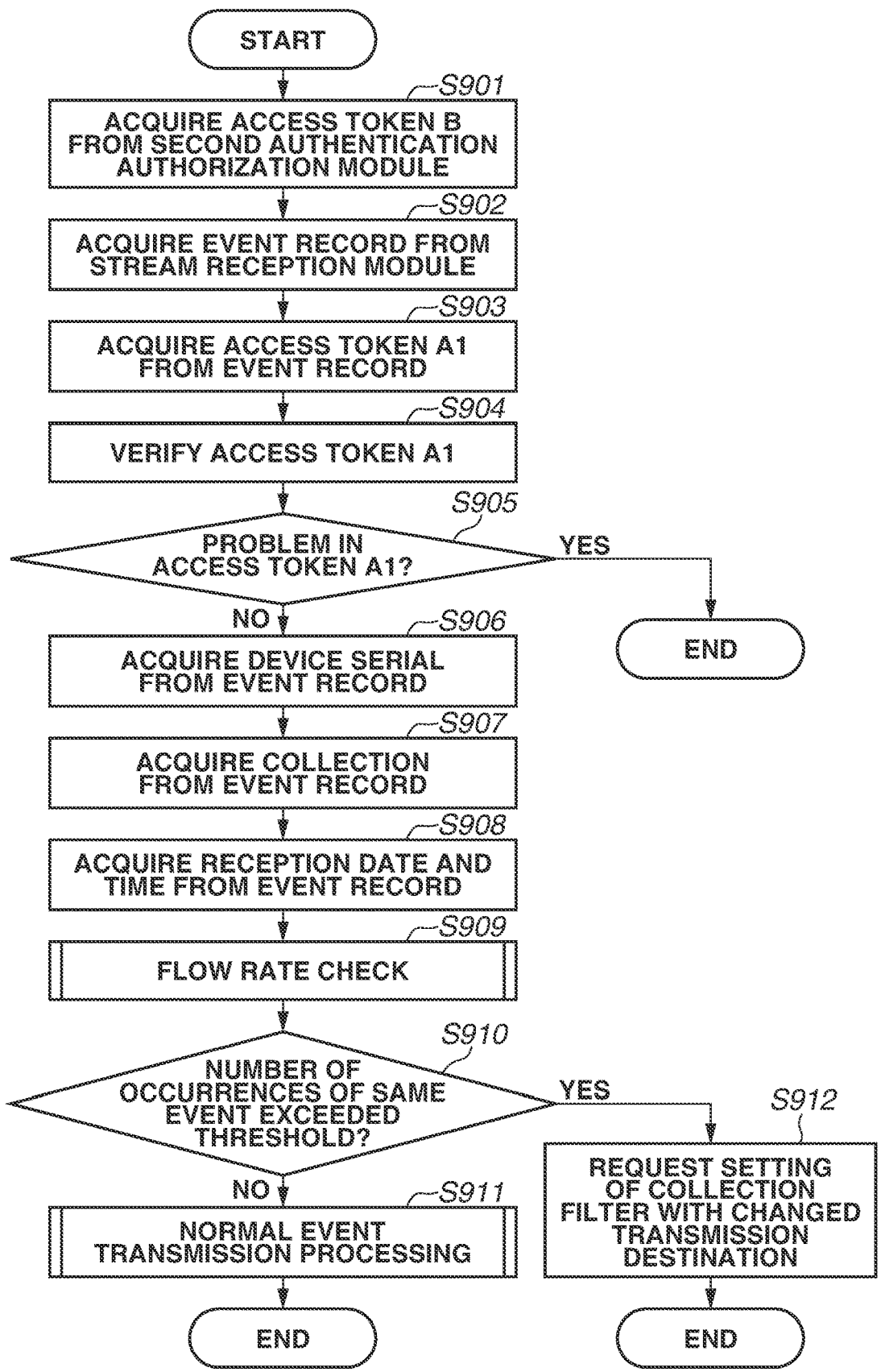
Figure 9C:
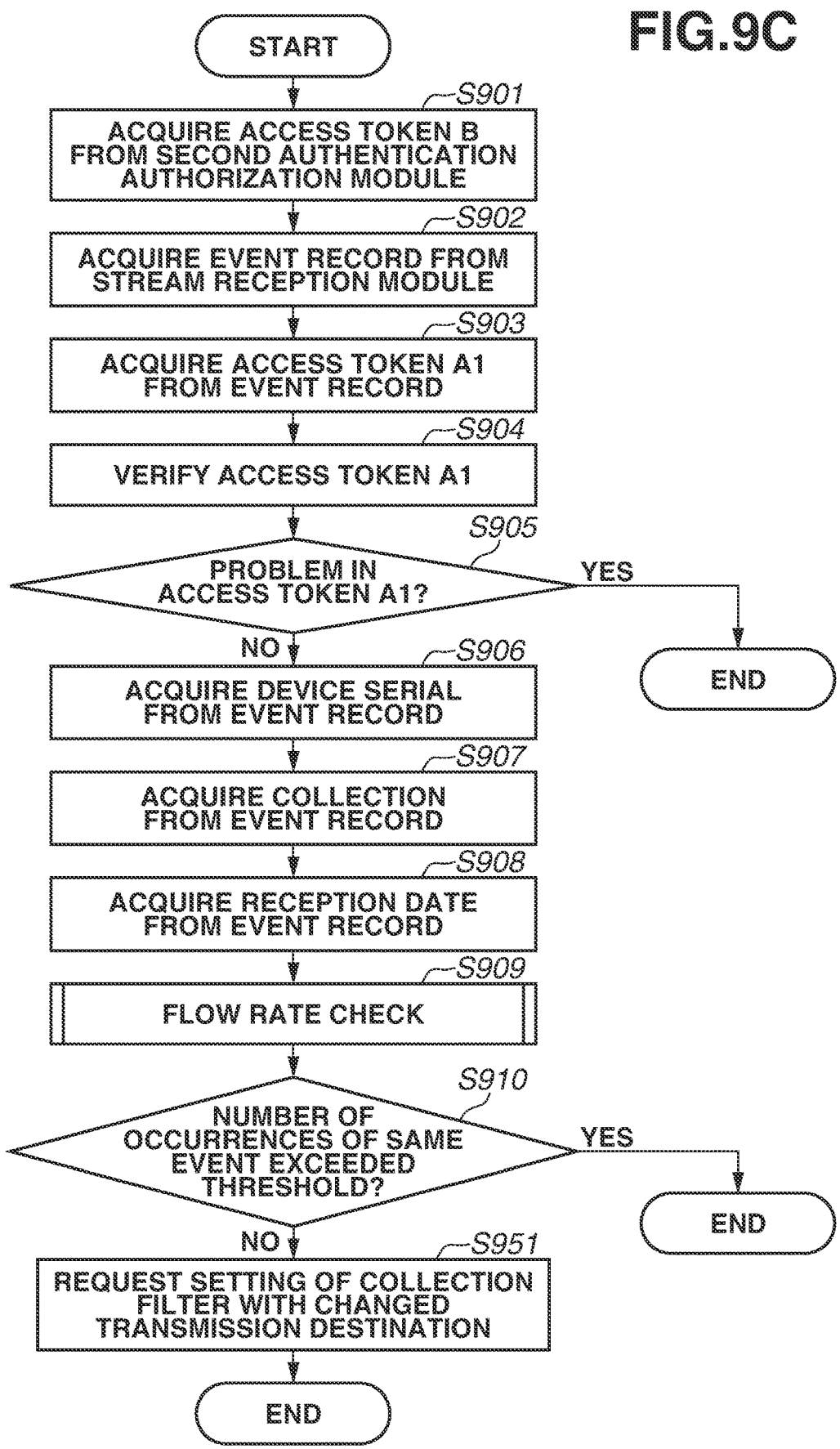

The event data transmitted to the changed transmission destination is subjected to the processing of the flow rate check based on the flow illustrated in FIG. 9C. In a case where the flow rate is returned to the normal flow rate, processing to reset the collection filter in which the transmission destination of the event has been returned to the normal transmission destination is performed.

Processing in steps S901 to S910 in FIG. 9C is the same as the processing illustrated in FIG. 9A. Therefore, description of the processing is omitted.

In step S951, the collection filter transmission module 323 transmits, to the collection filter reception module 305 of the client terminal 102, the collection filter in which the transmission destination has been returned to the normal transmission destination. The collection filter in which the transmission destination has been returned is the collection filter 601 as illustrated in FIG. 6A. The client terminal 102 may cache the collection filter 601 of FIG. 6A, and the collection filter transmission module 323 may only give an instruction to change the collection filter without transmitting the collection filter in step S951.

In step S951, the stream processing module 322 deletes the events exceeding the threshold because the events are unnecessary for normal processing. In a case where the data of the events abnormally occurred is used to analyze the abnormal state later, the events may be separately stored.

In the description of step S933, the stream processing module 322 checks whether the number of occurrences of event per unit time has exceeded the predetermined value represented by the threshold. Alternatively, not the reception service system but the client terminal may check whether the number of occurrences of event per unit time has exceeded the threshold. In the case where the number of occurrences of event per unit time has exceeded the threshold, the client terminal may notify the reception service system that the number of occurrences of event per unit time has exceeded the threshold, and the reception service system that has received the notification may transmit the collection filter to the client terminal. Further, in the case where the client terminal determines that the number of occurrences of event per unit time has exceeded the threshold, the client terminal may change the collection filter held by the own device, and notify the reception service system of the change of the collection filter. Furthermore, the client terminal may transmit the data not to the evacuation stream reception server 126 but to a storage (not illustrated) inside the reception service system. In this case, the reception service system may not include the evacuation stream reception server 126. In addition, the reception service system having determined that the number of occurrences of event per unit time has exceeded the threshold may instruct the client terminal to change the collection filter.

In the case where the unexpected large amount of data is transmitted from the client terminal 102, the collection in which the transmission destination has been changed is set to the client terminal 102 as described above with reference to the sequence diagram of FIG. 8 and the flowcharts of FIGS. 9A, 9B, and 9C. As a result, the data is excluded from the target of the normal processing, which makes it possible to provide the service without delaying processing of the data from the other client terminals that normally operate. Further, monitoring the flow rate of the event data transmitted to the different transmission destination makes it possible to automatically detect that the client has returned to the normal state. In a case where the client has returned to the normal state, it is possible to resume providing of the service to the client.

A second exemplary embodiment of the present disclosure is described. In the following, configurations different from the configurations according to the first exemplary embodiment are only described. In the first exemplary embodiment, the flow rate of the event is monitored, and the transmission destination of the event is changed in the case where the flow rate is detected as abnormal. However, if abnormality continues for a long time and the device is not restored, the resources of the stream reception server as the changed transmission destination and the resources of the data collection server are wasted. Accordingly, in the second exemplary embodiment, in the case where abnormality in the flow rate of the event continues for a long time, a collection to stop transmission of the event is set to the device.

A flow relating to event transmission stop processing according to the present exemplary embodiment is described with reference to FIG. 10. In FIG. 10, processing in steps S901 to S911 is the same as the processing illustrated in FIG. 9A. Therefore, description of the processing is omitted.

In step S1001, the stream processing module 322 manages, by Table 1, an elapsed time from timing when it is determined that the number of occurrences of event has exceeded the threshold, with respect to the device and the collection in which it is determined that the number of occurrences of event has exceeded the threshold in the processing in step S910. For example, in a case where the current time is 2018/09/02 01:00:00 and the elapsed time is one hour, it is determined that the number of occurrences of event is larger than or equal to the threshold and the flow rate of the event is abnormal with respect to the device serial AAA12345 and the collection Error, from Table I. In a case where the number of devices and collections that are still in the abnormal state after a prescribed time from the timing when it is determined that the number of occurrences of event has exceeded the threshold, is one or more (YES in step S1001), information on the devices and collections is passed, and the processing proceeds to step S1002. In a case where the number of devices or collections in which abnormality for a long time larger than or equal to the threshold does not occur but it is determined that the flow rate of events is abnormal, is one or more (NO in step S1001), information on the devices and the collections is passed, and the processing proceeds to step S1003. In a case of the example of Table 9, device serials AAA12346 and AAA12347 are passed to processing in step S1003.

TABLE I

| Event history table (data collection server 113) | | | |
|---|---|---|---|
| Device serial | Collection name | Abnormality determination reception date and time | Transmission destination change flag |
| AAA12345 | Error | 2018 Sep. 1 00:00:00 | True |
| AAA12346 | Error | 2018 Sep. 1 00:30:00 | True |
| AAA12347 | Error | 2018 Sep. 2 01:00:00 | False |

In step S1002, the stream processing module 322 uses the information on the devices and the collections passed from the processing in step S1001, to request event transmission stop setting. In step S1003, the stream processing module 322 searches Table I based on the information on the devices and the collections passed from the processing in step S1001, and checks a transmission destination change flag. The transmission destination change flag represents whether a request to change the collection transmission destination has been already issued. The flag is checked in order to request only the device and the collection that do not receive the collection filter setting request, to change the transmission destination. In the case of the example illustrated in Table I, the transmission destination of the device having the device serial AAA12346 has been already changed. Therefore, the device serial AAA12347 and the collection information thereof are only passed, and the processing proceeds to step S1004.

In step S1004, the stream processing module 322 performs processing to change the transmission destination on the device and the collection passed from the processing in step S1003. The processing itself is the same as the processing described in step S912. After the processing to change the transmission destination is performed, the transmission destination change flag in Table I is changed to True.

At least any of the processing in steps S1001, S1002, S1003, and S1004 may be performed by the client terminal. The collection representing the setting of the event transmission stop may be held by the client terminal.

The processing is performed based on the method described according to the second exemplary embodiment, which makes it possible to instruct the device and the collection that are in the abnormal state for a long time to stop transmission, and to prevent the resources of the server from being wasted.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-042588, filed Mar. 8, 2019, which is hereby incorporated by reference herein in its entirety.

What is claimed is:

1. A system, comprising:
a plurality of client terminals; and
a reception service system which receives data relating to an event that occurred in each of the plurality of client terminals from the plurality of client terminals,
wherein the reception service system includes
a first queue which receives data from the plurality of client terminals, wherein the data received by the first queue is processed in a processing system included in the system;
a second queue which is different from the first queue, wherein the data received by the second queue is not processed in the processing system;
one or more first memories storing first instructions, and
one or more first processors which execute the first instructions to:
monitor an amount of data received by the first queue per unit time;
in a case where an amount of data which the first queue receives from a client terminal included in the plurality of client terminals per unit time exceeds a predetermined value, instruct the client terminal to change a transmission destination from the first queue to the second queue,
wherein the predetermined value is a standard value for changing the transmission destination from the first queue to the second queue, and
wherein each of the plurality of client terminals includes one or more second memories storing second instructions, and
one or more second processors which execute the second instructions to:
transmit data to the first queue; and
in a case where it is instructed to change the transmission destination from the first queue to the second queue, transmit data to the second queue and not transmit data to the first queue.

2. The system according to claim 1,
wherein the one or more first processors further execute the second instructions to transmit a transmission rule to the plurality of client terminals,
wherein a second transmission rule for transmitting data to the second queue is transmitted to the client terminal as an instruction for changing the transmission destination from the first queue to the second queue, and
wherein data is transmitted to the second queue according to the second transmission rule for transmitting data to the second queue.

3. The system according to claim 2,
wherein the one or more first processors further execute the first instructions to:
monitor an amount of data received by the second queue per unit time;
in a case where an amount of data transmitted from the client terminal to the second queue becomes lower than or equal to the predetermined value, instruct the client terminal to change a transmission destination from the second queue to the first queue, and wherein the one or more second processors further execute the second instructions to transmit data to the first queue in a case where it is instructed to change the transmission destination from the second queue to the first queue.

4. The system according to claim 2, further comprising a state management server configured to manage state information on each of the plurality of client terminals, wherein the reception service system transmits the second transmission rule for transmitting data to the second queue to the client terminal by changing the state information on the client terminal managed by the state management server.

5. The system according to claim 1, wherein each client terminal is further configured to:

in a case where it is determined that the amount of data transmitted from the client terminal to the first queue per unit time exceeds the predetermined value, change a first transmission rule for transmitting data to the first queue to a second transmission rule for transmitting data to the second queue; and in a case where it is determined that an amount of data transmitted from the client terminal to the second queue is lower than or equal to the predetermined value, change the second transmission rule for transmitting data to the second queue to the first transmission rule for transmitting data to the first queue, wherein the client terminal changes a transmission rule without receiving an instruction from the reception service system.

6. The system according to claim 1, wherein the reception service system is further configured to determine whether an amount of data transmitted from each of the plurality of client terminals to the first queue per unit time exceeds the predetermined value.

7. The system according to claim 1, wherein the reception service system is further configured to determine whether an amount of data transmitted from the client terminal to the second queue per unit time exceeds the predetermined value.

8. The system according to claim 1, wherein each client terminal is further configured to determine whether an amount of data transmitted from the client terminal to the first queue or the second queue per unit time exceeds the predetermined value.

9. The system according to claim 1, further comprising a resource service system configured to perform a predetermined processing on data of the client terminals received from the reception service system, wherein the resource service system does not perform the predetermined processing on the data received by the second queue but performs the predetermined processing on the data received by the first queue.

10. The system according to claim 9, wherein the reception service system is further configured to:

transmit a first transmission rule for transmitting data to the first queue or a second transmission rule for transmitting data to the second queue to the client terminal, and in a case where one of the first and second transmission rules has been transmitted to the client terminal, notify the resource service system of an event representing that one of the first and second transmission rules has been transmitted to the client terminal.

11. The system according to claim 1, wherein each client terminal is further configured to hold a third transmission rule for non-transmission of data to both of the first queue and the second queue in a case where an amount of data transmitted from the client terminal to the second queue per unit time is not lower than or equal to the predetermined value when a prescribed time elapses after the amount of data transmitted from the client terminal to the first queue per unit time exceeds the predetermined value, and wherein the data relating to the event that occurred in the client terminal is not transmitted to both of the first queue and the second queue based on the third transmission rule.

12. A method of controlling a system that includes a plurality of client terminals and a reception service system receiving data relating to an event that occurred in each of the plurality of client terminals from the plurality of client terminals, the method comprising:

causing each of the plurality of client terminals to transmit data to the reception service system;

causing the reception service system to receive data from the plurality of client terminals by a first queue, wherein the data received by the first queue is processed in a processing system included in the system;

causing the reception service system to receive data from the plurality of client terminals, by a second queue that is different from the first queue, wherein the data received by the second queue is not processed in the processing system;

causing the reception service system to monitor an amount of data received by the first queue per unit time; and causing the reception service system, in a case where an amount of data which the first queue receives from a client terminal included in the plurality of client terminals per unit time exceeds a predetermined value, to instruct the client terminal to change a transmission destination from the first queue to the second queue and not transmit data to the first queue, wherein the predetermined value is a standard value for changing the transmission destination from the first queue to the second queue.

* * * * *